United States Patent
Yang et al.

(10) Patent No.: US 10,985,926 B2
(45) Date of Patent: Apr. 20, 2021

(54) MANAGING EMBEDDED UNIVERSAL INTEGRATED CIRCUIT CARD (EUICC) PROVISIONING WITH MULTIPLE CERTIFICATE ISSUERS (CIS)

(71) Applicant: Apple Inc., Cupertino, CA (US)

(72) Inventors: Xiangying Yang, Cupertino, CA (US); Avinash Narasimhan, Cupertino, CA (US); Li Li, Los Altos, CA (US); David I. Ahn, Sunnyvale, CA (US); Jean-Marc Padova, San Francisco, CA (US); Clark P. Mueller, San Jose, CA (US); David T. Haggerty, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 186 days.

(21) Appl. No.: 16/117,642

(22) Filed: Aug. 30, 2018

(65) Prior Publication Data

US 2019/0074983 A1 Mar. 7, 2019

Related U.S. Application Data

(60) Provisional application No. 62/553,651, filed on Sep. 1, 2017.

(51) Int. Cl.
*H04L 29/06* (2006.01)
*H04L 9/32* (2006.01)
*H04W 12/00* (2021.01)
(Continued)

(52) U.S. Cl.
CPC ............ *H04L 9/3268* (2013.01); *H04L 9/006* (2013.01); *H04L 9/3066* (2013.01); *H04L 9/321* (2013.01);
(Continued)

(58) Field of Classification Search
CPC ..... H04L 63/20; H04L 63/205; H04L 9/3268; H04L 9/006; H04L 9/3066; H04L 9/321;
(Continued)

(56) References Cited

U.S. PATENT DOCUMENTS

2006/0159091 A1 7/2006 Boers et al.
2007/0234045 A1* 10/2007 Ishiyama ............ H04L 63/0823
713/158
(Continued)

FOREIGN PATENT DOCUMENTS

CN 104754552 A 7/2015
CN 106416331 A 2/2017

OTHER PUBLICATIONS

"RSP Technical Specification Version 2.1," GSM Association, Feb. 27, 2017, 247 pages.
(Continued)

*Primary Examiner* — Malcolm Cribbs
(74) *Attorney, Agent, or Firm* — Dickinson Wright RLLP

(57) ABSTRACT

Embodiments provided herein identify a certificate issuer (CI) to be relied on as a trusted third party by an electronic subscriber identity module (eSIM) server in remote SIM provisioning (RSP) transactions with an embedded universal integrated circuit card (eUICC). In an RSP ecosystem, multiple CIs may exist. Parties rely on public key infrastructure (PKI) techniques for establishment of trust. Trust may be established based on a trusted third party such as a CI. Parties need to agree on the CI in order for some PKI techniques to be useful. Embodiments provided herein describe approaches for an eUICC and an eSIM server to arrive at an agreed-on CI. Candidate or negotiated CIs may be indicated on a public key identifier (PKID) list. A PKID list is distributed, in some embodiments, by means of a
(Continued)

discovery server, via an activation code (AC) and/or during the establishment of a profile provisioning session.

20 Claims, 11 Drawing Sheets

(51) Int. Cl.
    *H04L 9/00*     (2006.01)
    *H04L 9/30*     (2006.01)

(52) U.S. Cl.
    CPC .......... *H04L 9/3252* (2013.01); *H04L 9/3265* (2013.01); *H04L 9/3273* (2013.01); *H04W 12/0023* (2019.01); *H04W 12/00401* (2019.01); *H04L 2209/38* (2013.01)

(58) Field of Classification Search
    CPC ... H04L 9/3252; H04L 9/3265; H04L 9/3273; H04L 2209/38; H04W 12/0023; H04W 12/00401
    See application file for complete search history.

(56) References Cited

U.S. PATENT DOCUMENTS

| | | | |
|---|---|---|---|
| 2009/0210701 A1* | 8/2009 | Zhang | H04N 21/63775 |
| | | | 713/156 |
| 2015/0229475 A1* | 8/2015 | Benoit | H04L 9/14 |
| | | | 713/168 |
| 2015/0350878 A1 | 12/2015 | Li et al. | |
| 2016/0234020 A1 | 8/2016 | Nix | |
| 2016/0330618 A1 | 11/2016 | Ren et al. | |
| 2019/0394053 A1* | 12/2019 | Yu | H04L 9/30 |

OTHER PUBLICATIONS

Chinese Patent Application No. 201811006596.0—First Office Action dated Nov. 23, 2020.

* cited by examiner

DETERMINE A CERTIFICATE ISSUER TRUSTED BY BOTH A SOURCE eSIM SERVER AND A RECIPIENT eUICC.

MANAGING EMBEDDED UNIVERSAL INTEGRATED CIRCUIT CARD (EUICC) PROVISIONING WITH MULTIPLE CERTIFICATE ISSUERS (CIS)

CROSS-REFERENCE TO RELATED APPLICATIONS

This application claims the benefit of U.S. Provisional Application No. 62/553,651, entitled "MANAGING EMBEDDED UNIVERSAL INTEGRATED CIRCUIT CARD (eUICC) PROVISIONING WITH MULTIPLE CERTIFICATE ISSUERS (CIs)," filed Sep. 1, 2017, which is incorporated by reference herein in its entirety for all purposes.

FIELD

The described embodiments relate to managing embedded universal integrated circuit card (eUICC) provisioning, including determining one or more certificate issuers (CIs) trusted by both an electronic subscriber identity module (eSIM) server and an eUICC of a wireless device.

BACKGROUND

An eSIM or profile includes software and authentication functions related to a mobile network operator (MNO). The profile may be present on a secure element (SE) within a wireless device receiving services from the MNO. Universal integrated circuit cards (UICCs) and embedded UICCs (eUICCs) are examples of SEs used for hosting profiles. A new profile can be provisioned by an eSIM server to an eUICC of a wireless device. An example of an eSIM server includes a Subscription Manager Data Preparation (SM-DP) entity or an enhanced SM-DP referred to as an SM-DP+.

A profile is a combination of operator data and applications provisioned on an SE in a device for the purpose of providing services by an operator, for example, an MNO. An SE can be identified by an eUICC identifier, which is a unique number that may be referred to as an EID. A universal subscriber identity module (USIM) is an example of a type of profile. A profile can be identified by a unique number an Integrated Circuit Card Identifier (ICCID).

A wireless operator is a company providing wireless cellular network services. An MNO is an entity providing access capability and communication services to its subscribers through a mobile network infrastructure. A wireless device may also be referred to herein as simply a device. An end user or customer is a person using a device. An enabled profile can include files and/or applications which are selectable over an interface between an SE of a device and processing circuitry of the device external to the SE. To use the device, the profile is activated with the MNO. Placing a new profile on an SE within a device is referred to as provisioning. A logical entity in the device that may assist with provisioning can be a combination of hardware, firmware, and/or device software, including for example a local profile assistant (LPA). A document related to management of profiles in consumer devices is GSM Association (GSMA) document GSMA SGP.22: "RSP Technical Specification," (hereinafter "SGP.22").

An eUICC includes an operating system, and the eUICC operating system can include an ability to provide authentication algorithms to network access applications associated with a given operator. A security domain within an eUICC can include over the air (OTA) keys for an MNO and can provide a secure OTA communication channel for communicating between the eUICC and a network entity of the MNO. OTA keys are credentials used by an MNO for remote management of MNO profiles on an eUICC.

Communications of an eUICC can be authenticated using public key infrastructure (PKI) techniques. Certificates used for authentication and confidentiality purposes can be generated by a certificate issuer (CI). A public key certificate may also be referred to herein simply as a certificate. A device, an eUICC, and/or a profile may store a copy of a certificate, where the certificate includes a name of a given party (e.g., a user identity). The name may be specified in terms of an object identifier (OID). A public key recorded in the certificate can be used to check a signature of a message signed using a corresponding PKI private key of the given party. One example of a PKI certificate is an X.509 certificate, such as described in the Internet Engineering Task Force (IETF) Request For Comments (RFC) 5280.

A CI is an entity that signs public key infrastructure (PKI) certificates. Authentication and encryption can be implemented by a party using a public key—private key pair (also referred to herein as a PKI public key—private key pair). The public key can be distributed to other parties by providing a certificate that includes the public key, where the certificate is signed by a CI. An identifier of the public key may be referred to herein as a PKID. The CI itself provides a self-signed certificate, which may be referred to as a CI certificate. An entity that distributes its own public key in an entity certificate signed by a CI may be referred to as attached to the CI certificate.

A CI may be certified by a certifying authority, such as a standards body, e.g., GSMA. In some instances, a certifying authority can seek to ensure that eSIM servers used during the lifecycle of a profile are attached to the same CI certificate. In some instances, a profile owner, e.g., an MNO, may require that an eSIM server distributing a profile owned by the profile owner be attached to a specific CI certificate.

When a user purchases a new device, the user activates the device by selecting an MNO for network services. Activation is often performed using an activation code (AC). An AC may include an eSIM server address and a reference to a CI certificate.

A remote subscriber identity module (SIM) provisioning (RSP) ecosystem can include CIs, MNOs, eSIM servers (examples of which include SM-DP and SM-DP+ network entities), devices (which can include an eUICC), eSIM discovery servers (examples of which include Subscription Management—Discovery Servers (SM-DSs)), and eUICC manufacturers (also referred to as EUMs). Various devices, servers and eUICCs may select an action to be taken based on policies. A policy contains rules; a rule determines a qualification for or enforcement action to be taken when a certain condition occurs. Additional exemplary general information on the relationships and behaviors of members of an RSP ecosystem can be found in SGP.22.

SUMMARY

Representative embodiments set forth herein disclose various systems and techniques for managing embedded universal integrated circuit card (eUICC) provisioning, including determining one or more certificate issuers (CIs) trusted by both an electronic subscriber identity module (eSIM) server and an eUICC of a wireless device.

A remote SIM provisioning (RSP) ecosystem includes a number of entities, some of which are attached to the same CI, and some of which do not share trust in the same CI. The primary actors involved in profile provisioning include an eSIM server and a logical entity (hardware, firmware, and/or software) of a device, e.g., a local profile assistant (LPA), acting in cooperation with an eUICC of the device. A profile is owned by an MNO. To use PKI techniques during provisioning, the eUICC and the eSIM server must trust a common CI. A recipient of a provisioned profile may be referred to as a recipient eUICC in some contexts herein. In some instances, the eSIM server providing the profile may be referred to as a source eSIM server.

In some embodiments, an MNO contracts with an operator of eSIM servers to establish a negotiated database of CIs to use during RSP. The negotiated database of CIs may be accessed during provisioning to determine a list of PKIDs that are eligible to be used by an active eSIM server during provisioning for signature creation and/or for session key generation by the eSIM server.

In some embodiments, an MNO contracts with an operator of eSIM servers to establish a negotiated database of CIs to be used by a recipient eUICC. For example, a list of PKIDs applicable for indicating keys to be used by the recipient eUICC for eUICC-created signatures during provisioning and/or for creation of a session key for encryption by the recipient eUICC.

In some embodiments, during provisioning of a profile to a recipient eUICC, a PKID list derived from a negotiated database is provided via a discovery server.

In some embodiments, during provisioning of a profile to a recipient eUICC, an eSIM server indexes into a negotiated database using ICCID and/or EID values to obtain a PKID list and then selects a CI from the PKID list for use by the eSIM server. In some embodiments, the PKID list is used for indicating the CI to be relied on for trust when the recipient eUICC creates signatures.

In some embodiments, rather than relying on a negotiated database, an MNO provides a PKI list in an activation code (AC) and the eUICC in concert with a logical entity of the device provides the PKID list to a source eSIM server during provisioning. An exemplary logical entity of the device to realize the functions described include any combination of hardware, firmware, and/or software that provides the functions, which can include, for example, a local profile assistant (LPA). The source eSIM server then selects a CI from the PKID list, provided the eSIM server trusts any such CI. The selected CI is then used by the source eSIM server for the RSP session.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, where like reference numerals designate like structural elements.

DETAILED DESCRIPTION

Figure 1A:
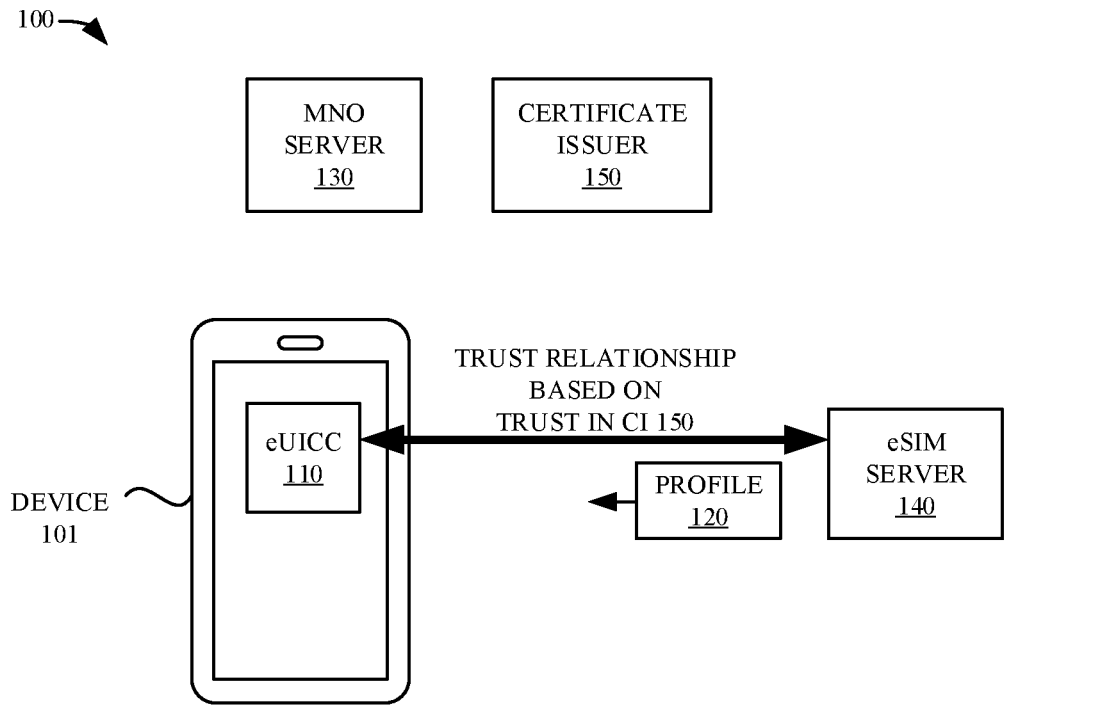
FIG. 1A illustrates a exemplary system including a CI in which a profile is provisioned to an eUICC.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

PKI techniques are used to prove identity (authentication) and protect confidentiality (encryption) without using preshared keys. PKI systems are made possible, in some cases, by trusted third parties. In a system with multiple, distinct, trusted third parties, embodiments provided herein manage determination of which trusted third party to rely on.

Before covering further details of embodiments, a review of some PKI essentials is now given. A trusted third party can be relied on to authenticate an identity of a sender to a recipient of a message. A basic transaction proceeds as follows. A sender composes a message and creates a tag called a signature by transforming the message using a private key. The sender sends the message and the signature to the recipient along with a certificate that includes a public key that corresponds to the private key used to generate the signature. The recipient examines the certificate. If the certificate is signed by a CI that the recipient trusts, then the recipient parses the public key from the message and verifies the signature on the message using the public key. If the signature verification succeeds, then the message has been authenticated by the recipient using the public key. If the recipient does not trust the CI identified in the certificate, then the recipient is unsure whether the private key associated with the public key is only in the possession of the sender. A skeptical recipient that does not trust the CI can consider the private key compromised and can conclude that the private key could be improperly used by an imposter to sign messages as if the imposter were the sender.

In remote SIM provisioning, a variety of keys can be used for different roles by different parties during a provisioning call flow. Two major function are authentication and profile binding. Examples of private keys as specified by GSMA in SGP.22 are given in Table 1. Other private keys than those listed in Table 1 can also be used for generating signatures and/or for ciphering (encryption/decryption) by a CI, an eSIM server, an eSIM discovery server, and/or an eUICC of a device. The keys listed are provided as examples only and embodiments are not limited to such examples only. A given private key of an entity corresponds to a given public key, and that given public key is distributed in a certificate of the entity, with the certificate signed by a CI. For example, row 2 describes a private key labeled SK.DPauth.ECDSA. A corresponding public key is distributed in a certificate, which may be labeled CERT.DP-AUTH. Row 3 describes another private key labeled SK.DPpb.ECDSA. The corresponding public key is distributed in a certificate, which may be labeled CERT.DP-PB.

TABLE 1

Example RSP Private Keys and Their Functions

| Table Row | GSMA Name (see SGP.22) | Description |
|---|---|---|
| 1 | SK.CI.ECDSA | Private key of a CI for signing certificates. |
| 2 | SK.DPauth.ECDSA | Private key of the eSIM server (SMDP+) for creating signatures for eSIM server authentication. |
| 3 | SK.DPpb.ECDSA | Private key of the eSIM server (SMDP+) for providing signatures for profile (eSIM) binding. |
| 4 | SK.DSauth.ECDSA | Private key of a discovery server (SM-DS) for creating signatures for SM-DS authentication. |
| 5 | SK.EUICC.ECDSA | Private key of an eUICC for creating signatures. |
| 6 | SK.EUM.ECDSA | Private key of an EUM for creating signatures. |
| 7 | SK.DP.TLS | Private key of an eSIM server for securing a transport layer security (TLS) connection. |
| 8 | SK.DS.TLS | Private key of an SM-DS for securing a TLS connection. |

Illustration of CI-Based Trust

FIG. 1A illustrates a system 100 in which an eSIM server 140 (sender) provisions an eSIM by sending profile 120 to an eUICC 110 housed in a device 101. The eUICC 110 trusts the CI 150. The eSIM server 140 also trusts the CI 150. As an example, the eSIM server 140 creates a signature using a private key. The eUICC 110 attempts to use a corresponding public key, from a certificate signed by the CI 150, to verify the signature. When the signature is verified, the eUICC 110 trusts the message sent from the eSIM server 140 because the eUICC 110 was able to use the public key from the certificate signed by the CI 150, which is a trusted entity. Trust is shown figuratively in FIG. 1A as a bold double-headed arrow. In some instances, there can be a chain of certificates signed by intermediate certificate authorities (CAs), with a final certificate signed by the CI 150. FIG. 30 of SGP.22 illustrates an exemplary "certificate chain" in which an eUICC has a certificate signed by an eUICC manufacturer (EUM) and the EUM has a certificate signed by a GSMA CI.

Figure 1B:
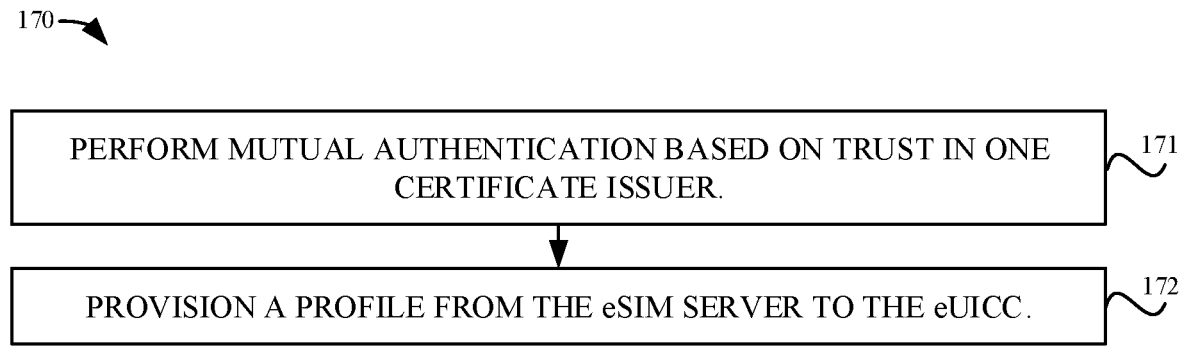
FIG. 1B illustrates exemplary logic for performing authentication and provisioning.

FIG. 1B illustrates logic 170 used in the basic transaction of FIG. 1A. At 171, the eUICC and eSIM server authenticate each other, relying on certificates signed by a single CI (or signed via a certificate chain). At 172, the eUICC and eSIM perform profile provisioning after mutual authentication.

RSP Ecosystem with Multiple CIs

Figures 1C, 1D:
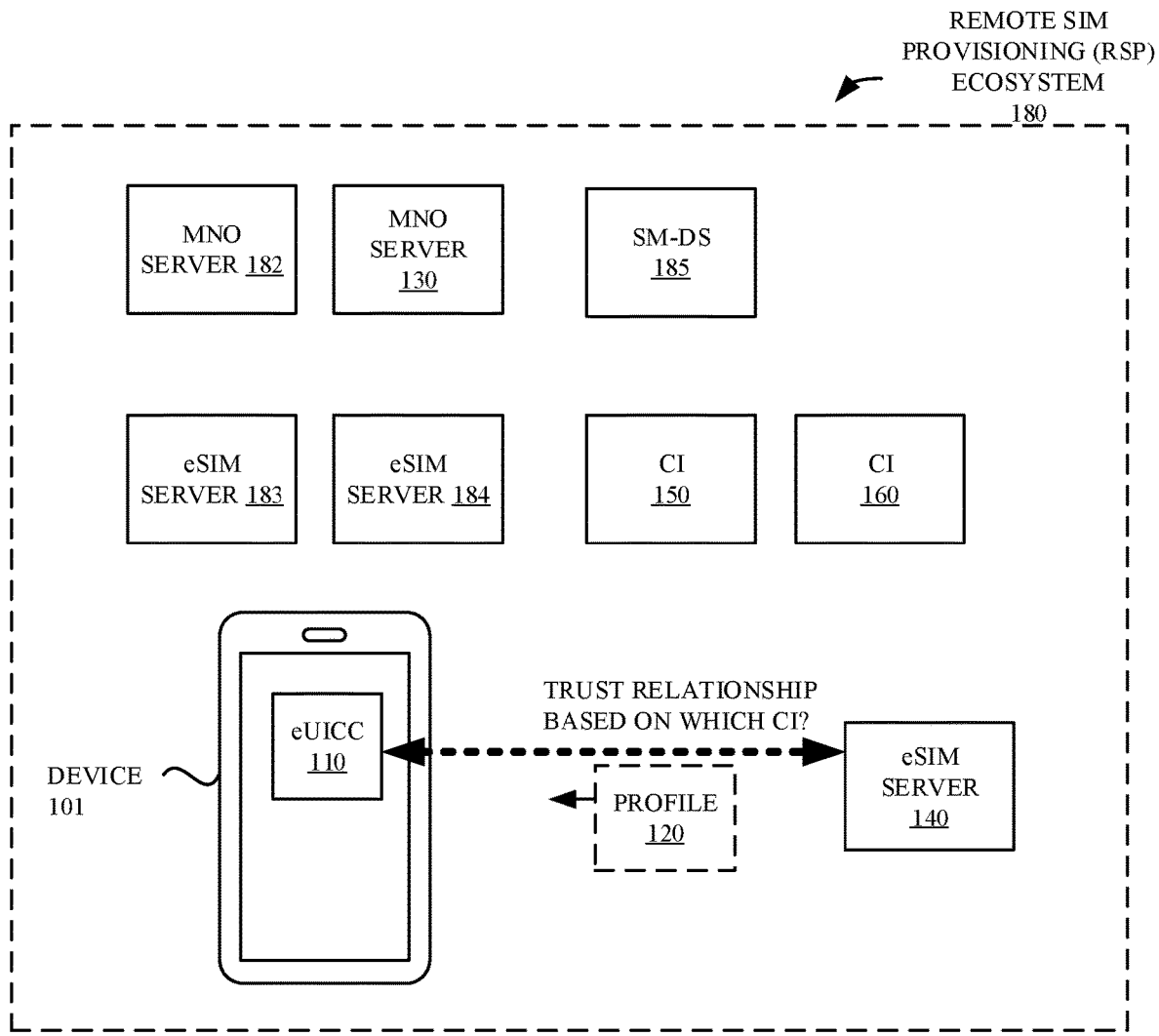
FIG. 1C illustrates an exemplary system in which multiple CIs are relied on for trust by various parties in an RSP ecosystem.
FIG. 1D illustrates exemplary logic for managing eUICC provisioning with multiple CIs, according to some embodiments.

FIG. 1C illustrates an exemplary RSP ecosystem 180 including an MNO server 130, an MNO server 182, an eSIM server 183, an eSIM server 184, a CI 160, a discovery server SM-DS 185, and entities from FIG. 1A. A basic question is posed in the figure next to the dashed bold double-headed arrow: "trust relationship based on which CI?" Possibly, the eUICC 110 does not trust a CI that the eSIM server 140 would usually use for provisioning. In that case, a provisioning session will not proceed until the eSIM server 140 attempts to use a different CI. To avoid stalled or delayed transactions, which may adversely affect the experience of at least a user of the device 101, embodiments provided herein manage eUICC provisioning in the exemplary ecosystem 180, which includes multiple CIs.

FIG. 1D illustrates exemplary logic 190 that determines a CI that is trusted by both the source eSIM server and a recipient eUICC.

Negotiated Database Logic

Figure 2A:
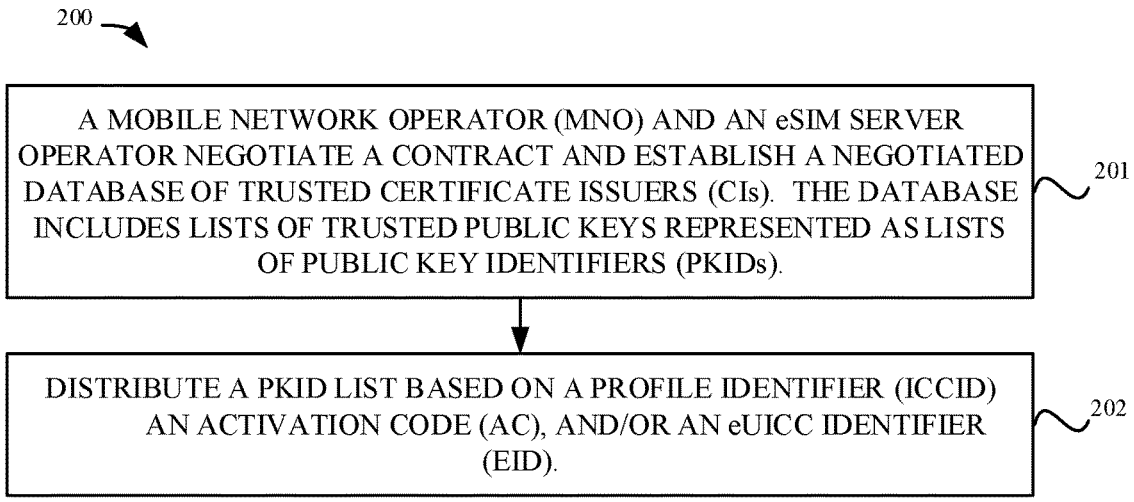
FIG. 2A illustrates exemplary logic for managing provisioning with multiple CIs, including negotiating a contract between an MNO and an eSIM server operator and establishing a negotiated database, according to some embodiments.

FIG. 2A illustrates exemplary logic 200 for establishing a negotiated database and for distributing a PKID list. At 201, an MNO and an eSIM server operator negotiate a contract and establish a negotiated database of trusted CIs. The database of trusted CIs includes lists of trusted public keys represented as lists of public key identifiers (PKIDs). At 202, a PKID list is distributed by an eSIM server, in consultation with the negotiated database. The PKID list includes PKIDs selected from the database of trusted CIs based on a profile identifier, an ICCID, and an eUICC identifier (EID).

Logic with Several PKID List Branches

Figure 2B:
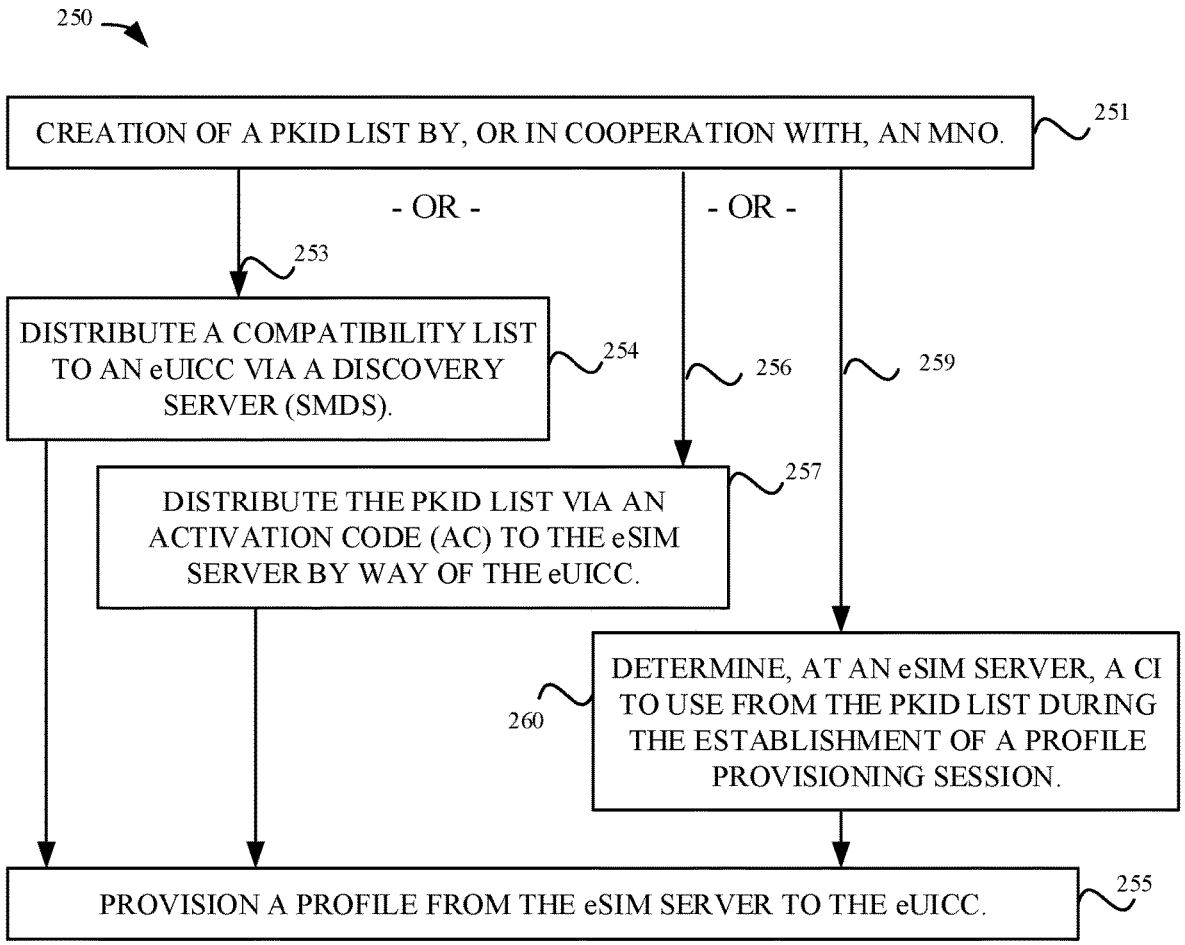
FIG. 2B illustrates exemplary logic for managing provisioning with multiple CIs, including establishing a PKID list by or in cooperation with an MNO and various ways to distribute the PKID list, according to some embodiments.

FIG. 2B illustrates exemplary logic 250 for use of PKID lists in a remote SIM provisioning (RSP) ecosystem 180. At 251, a PKID list is created by an MNO or in cooperation with an MNO. Cooperation with an MNO is exemplified by, for example, step 201 of FIG. 2A. After creating the PKID list, a variety of branches are provided in logic 250 for distribution or use of the PKID list. The logic 250, in some embodiments, is implemented without all 3 branches. For example, in some embodiments, only one or two of the logic paths 253/254, 256/257, or 259/260 exists.

Path 253 from 251 is taken in an embodiment based on a discovery server. At 254, a discovery server has stored a compatibility list after the creation of a negotiated database by an MNO and an eSIM server operator. The discovery server distributes the compatibility list to the eUICC at the time when the eUICC makes an inquiry as to eSIMs (profiles) which are pending to be downloaded to the eUICC. At 255, then, a provisioning session is performed with the eUICC relying on a PKID (corresponding to a CI) from the compatibility list. For more detail on the path 253/254, see FIG. 4.

Path 256 from 251 is taken in an embodiment based on distribution of a PKID list via an activation code (AC). At 257, a device logical entity, e.g., a combination of device hardware, firmware, and/or software, which can be realized in part as a local profile assistant (LPA), and an eUICC 110 receives an AC, where the AC includes a PKID list. The device logical entity, e.g., the LPA, and/or the eUICC 110 forwards the PKID list to the source eSIM server. For more detail on the path 256/257, see FIGS. 2C and 6.

Path 259 from 251 is taken in an embodiment using a negotiated database. During a provisioning session at 260, a source eSIM server obtains a PKID list from the negotiated database and selects a CI based on the list. For more detail on the path 259/260, see FIG. 5.

Logic for AC-Based PKID List Distribution

Figure 2C:
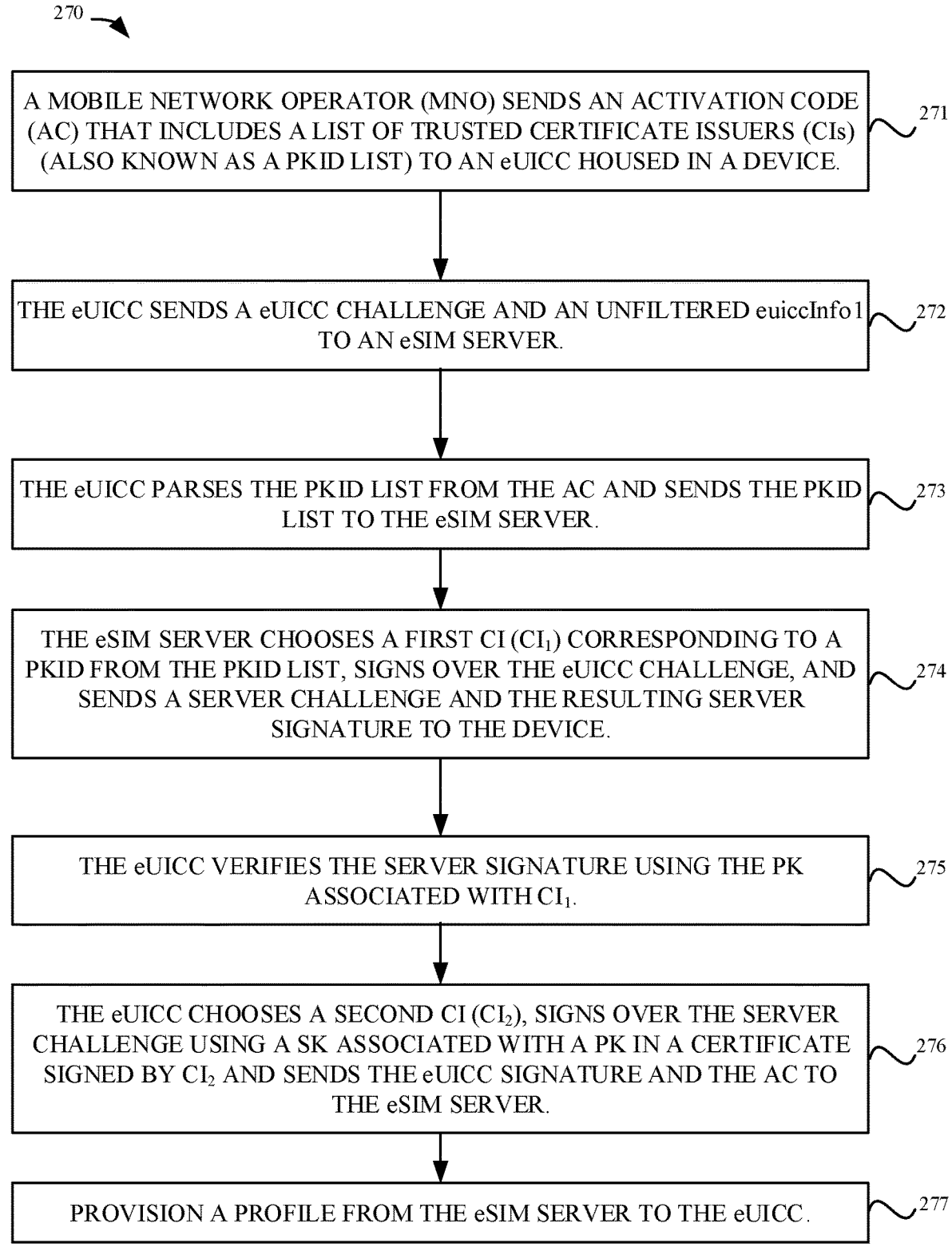
FIG. 2C illustrates exemplary logic for managing provisioning with multiple CIs, including sending a PKID list in an AC, according to some embodiments.

FIG. 2C illustrates exemplary logic 270 for AC-based PKID list distribution, according to some embodiments. At 271, an MNO sends an AC that includes a list of CIs to an eUICC. At 272, the eUICC sends an eUICC challenge and an unfiltered euiccnfo1 data structure to a source eSIM server. "Unfiltered" means that the euiccInfo1 structure has not been reduced or sorted based on the PKID list. The eUICC 110 and/or device software, at 273, parses the PKID list from the AC and sends the PKID list to the source eSIM server. At 274, the eSIM server chooses a first CI, referred to as CI', from the PKID list and uses the eSIM server private key associated with a $CI_1$-signed certificate holding the corresponding public key. At 275, the eUICC 110 verifies the eSIM server signature using the public key (PK) of the eSIM certificate signed by $CI_1$. At 276, the eUICC 110 chooses a second CI ($CI_2$) and signs the server challenge using a private key (SK) associated with a $CI_2$-signed certificate holding the corresponding public key. The eUICC 110 then sends the eUICC signature and the AC to the source eSIM server. At 277, the logic 270 continues with the provisioning of a profile from the source eSIM server to the eUICC 110. In the logic 270, some authentication steps performed by the eUICC 110 also involve additional device hardware, firmware, and/or software, such as an LPA 301. Examples of LPA interaction are described in SGP.22.

System

Figure 3:
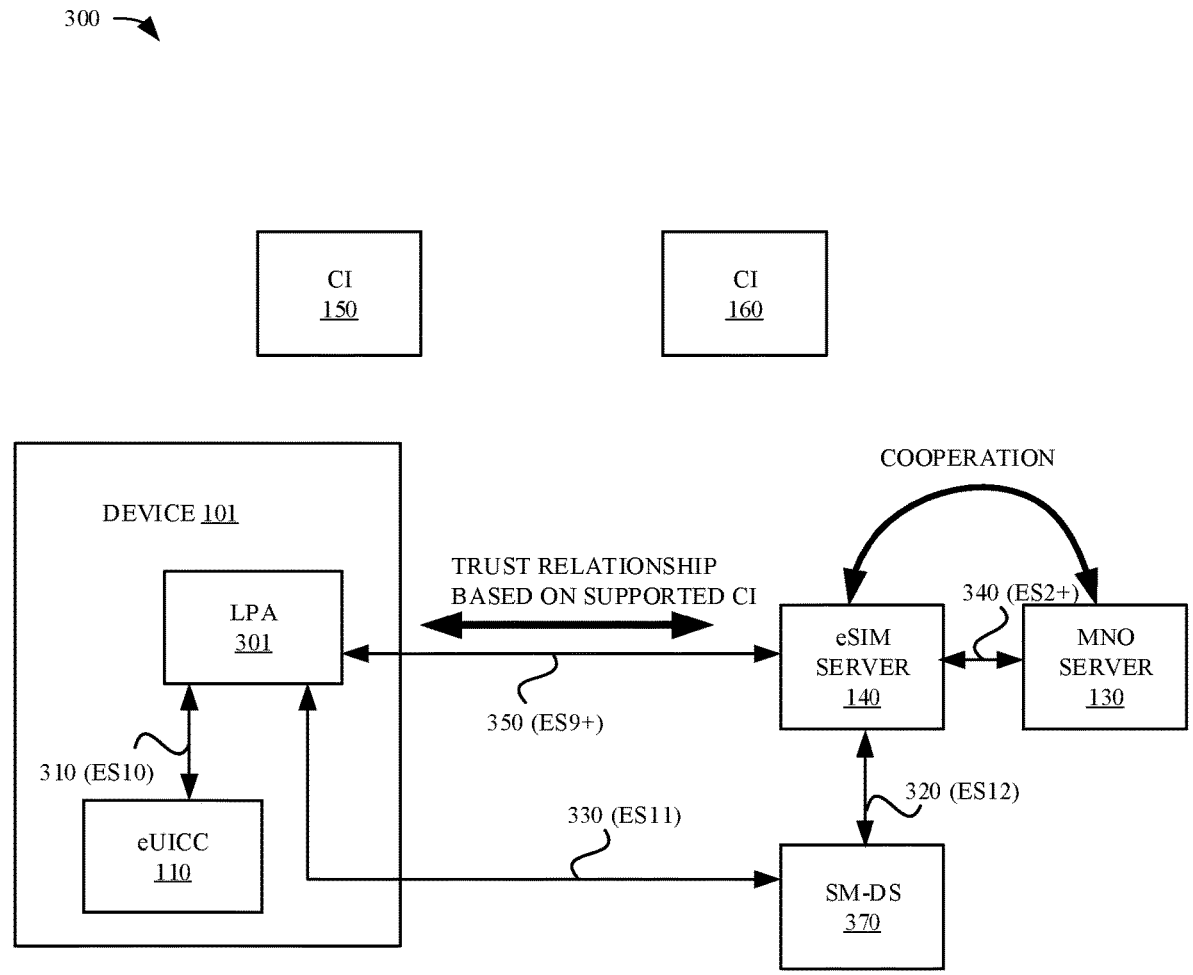
FIG. 3 illustrates a system in which an eSIM server operator and an MNO cooperate to manage provisioning in a system with multiple CIs, according to some embodiments.

FIG. 3 illustrates a system 300 that is a subset of the RSP ecosystem 180. In some embodiments, interfaces shown in FIG. 3 are realized using interfaces from SGP.22. In some embodiments, interfaces are realized as follows: FIG. 3 interface 310 as ES10, interface 330 as ES11, interface 350 as ES9, interface 340 as ES2+, interface 320 as ES12. In some embodiments, interfaces from the CIs 150 and 160 are realized as ESci (not shown in FIG. 3). The effective interface of 350 and 310 from the eSIM server 140 to the eUICC 110 via the LPA 301 can be realized as ES8, in some embodiments. The effective interface Further details of these interfaces are described in SGP.22. The LPA 301 of the device 101 is provided as an example of a logical entity that can realize certain functions used for authentication and/or for establishing a trust relationship and/or for communicating information between one or more network-based servers, e.g., eSIM server 140, MNO server 130, and/or SM-DS 370. The logical entity represented as LPA 301 can be a combination of hardware, firmware, and/or device software, and the use of LPA 301 as an exemplary embodiment is not intended to be limiting.

In some embodiments, the MNO and the eSIM server operator cooperate to create a negotiated database. A CI for use as part of RSP is then determined based on the negotiated database. Such a CI may be referred to as a supported CI. Using one or more supported CIs, the eSIM server then provisions a profile to the eUICC 110. Other management actions may also occur in addition to or in place of provisioning (e.g., deletion of a profile).

Embodiments presented herein are also applicable for TLS sessions. That is, rather than having an end-goal of an RSP action such as profile provisioning, the methods and devices presented herein for determining a CI to be used are used during the handshaking phase of setting up a transport layer security (TLS) session. TLS is described further in RFC 2246.

Discovery Server Compatibility List

Figure 4:
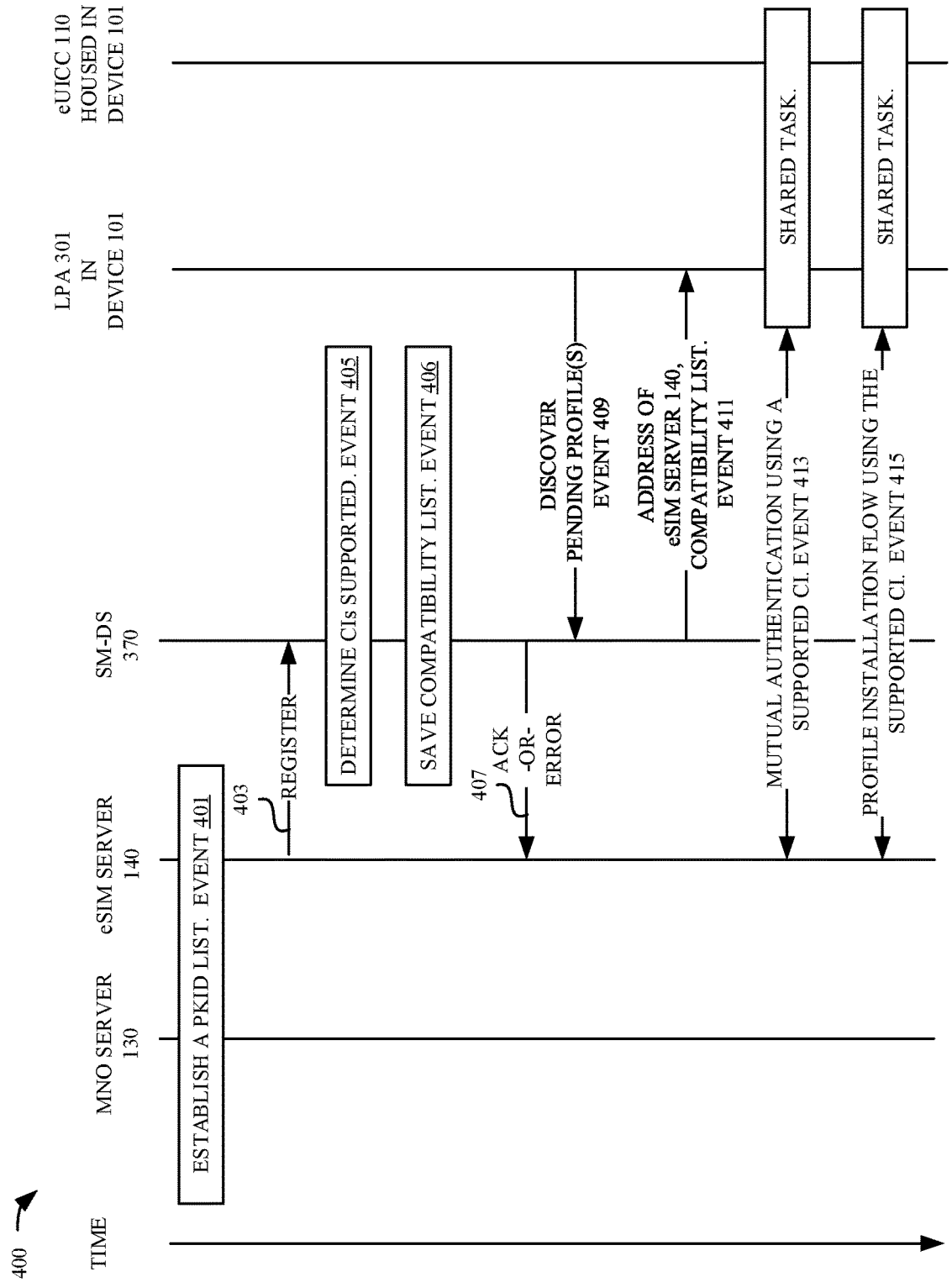
FIG. 4 illustrates an exemplary message flow diagram in which a compatibility list is established at a discovery server, according to some embodiments.

FIG. 4 illustrates an exemplary message flow 400. Entity names are given across the top. A timeline runs down the left side of the figure, with time advancing from top to bottom of the figure. At event 401, the MNO server 130 and the eSIM server 140 establish a PKID list. Message 403 indicates the following action. The eSIM server 140 sends a register message to a discovery server SM-DS 370, which may be SM-DS 185 of FIG. 1C. The register message has a purpose of creating an entry called an event record at the discovery server SM-DS 370; the event record is associated with an Event ID. The event record indicates that the eSIM server 140 has a profile reserved for eUICC 110 (eUICC 110 is identified by an EID). In some embodiments, the register message is a RegisterEvent message including ES12 parameters and a list of CIs that are trusted. The list of CIs, in some embodiments, includes object identifiers (OIDs). A trusted CI or PKID may also be referred to as a supported curve, and the supported CI may be identified by a curve OID. The list of CIs, in some embodiments, includes PKIDs, where a PKID is a hash of a corresponding PK and thus includes information of an associated elliptic curve. A hash is an output of a hash function. A hash function maps binary strings of arbitrary length to binary strings of a fixed length called a hash value or simply a hash. An example of a hash function used in SGP.22 is SHA256. At event 405, in some embodiments, the SM-DS 370 determines CIs supported by the eUICC 110. In some instances, the SM-DS 370 is operated by a manufacturer of the device 101, and accordingly the SM-DS 370 has specific information about a configuration of the device 101 including the EID of the eUICC 110 and information on CIs supported by the eUICC 110. If at least one CI match is found between an eSIM server CI list and CIs supported for a given EID of the eUICC 110 of the device 101, then the supported CIs can be recorded with reference to an Event ID and the EID included in the event record. At event 406, the SM-DS 370 forms and saves a compatibility list including only those CIs that are supported by both the eSIM server 140 and the eUICC 110. At 407, the SM-DS 370 sends an acknowledgement to the eSIM server 140 if the compatibility list has at least one entry; otherwise, if the compatibility list is empty, the SM-DS 370 sends an error message, and a corresponding event will not be registered. This logic could also be applied at the eSIM server if eUICC information is known in advance to the eSIM server, in order for the eSIM server to decide whether an event should be registered (or not registered) at SM-DS 370.

At a later time, a logical entity of the device 101, e.g., LPA 301, seeks to discover if any profiles are pending. This is shown as event 409. In some embodiments, event 409 includes ES11 InitiateAuthentication and AuthenticateClient messages. At event 411, the SM-DS 370 responds with an address of the eSIM server 140, the Event ID, and the compatibility list. The logical entity of device 101, e.g., LPA 301, and the eUICC 110 commence a profile download at event 413, performing mutual authentication with a supported CI from the compatibility list. The logical entity of device 101, e.g., LPA 301, and the eUICC 110 perform authentication and profile download together, which is noted as a "shared task." More details on examples of an authentication and profile download can be found in SGP.22. After authentication, profile installation occurs using the supported CI as shown at event 415.

The discovery server approach prevents an eSIM server 140 (e.g., an SM-DP or SM-DP+) from associating a profile with an eUICC (identified by EID) that does not support a CI needed to install the profile. Such a profile is an incompatible profile. The discovery server approach also does not require any transaction between the SM-DS 370 and the eSIM server 140 to determine which CI needs to be used. At the time of eSIM download, a user benefits and avoids annoyance because the device immediately commences provisioning with a CI that will be supported by the eSIM server; thus avoiding delay.

Figure 5:
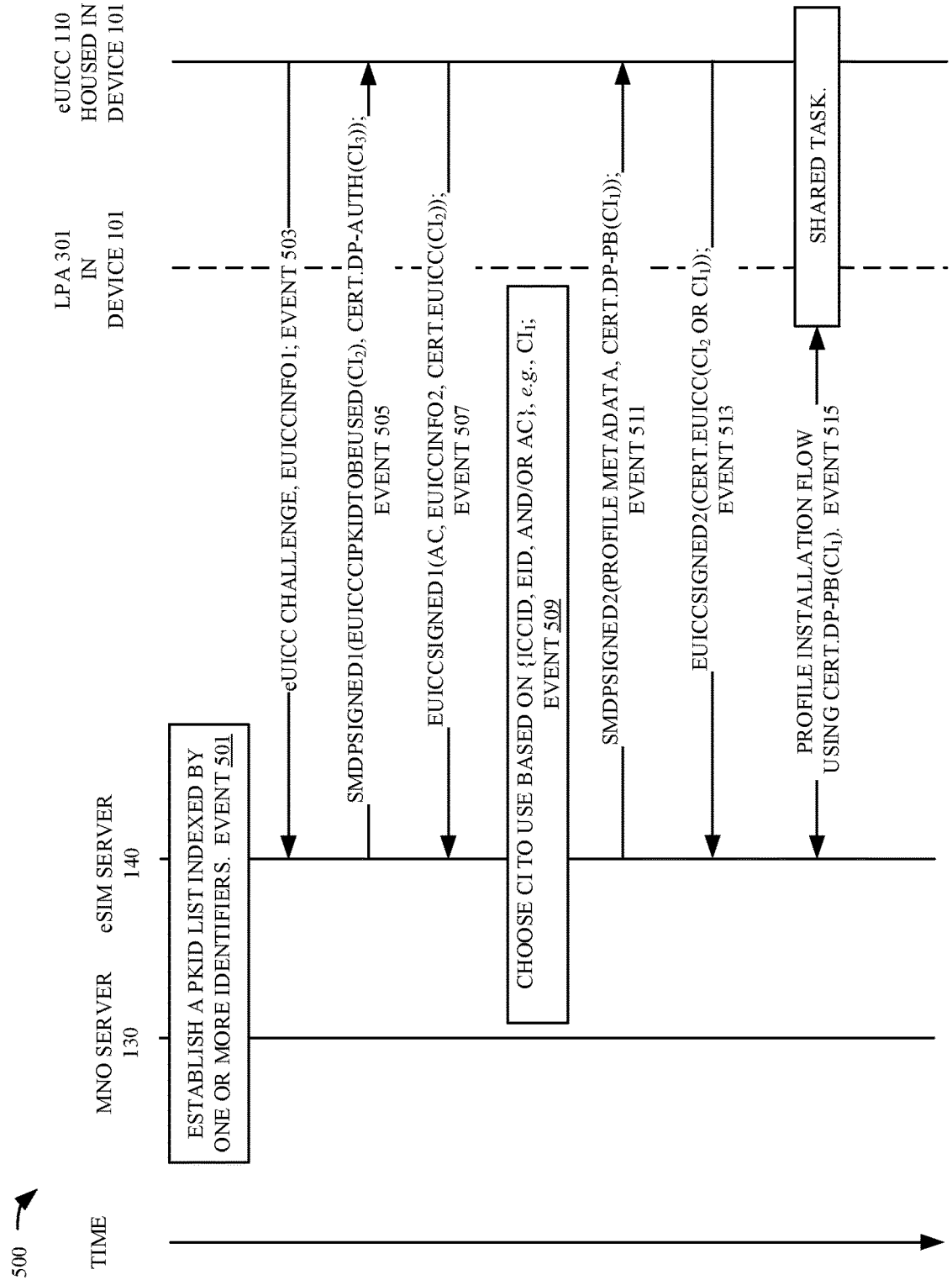
FIG. 5 illustrates an exemplary message flow diagram in which a PKID list is established by an MNO and an eSIM operator based on an eSIM identifier and an activation code, according to some embodiments.

Message Flow for Negotiated Database, Determine CI During Establishment of Session FIG. 5 presents an exemplary message flow 500 for an MNO and eSIM server operator to establish a negotiated database, and then use the negotiated database during establishment of a provisioning call flow to determine a CI. At 501, an MNO (represented by the MNO server 130) and an eSIM server operator (represented by the eSIM server 140) create a negotiated database. In some instances, the negotiated database will respond to queries based on one or more identifiers. For example, the database is indexed, in some embodiments, based on a profile identifier (ICCID), an eUICC identifier (EID) and/or an activation code (AC). The message flow 500 is an example of one approach to realizing the logic of FIG. 2A. Also see, FIG. 2B, reference numeral 260.

A provisioning call flow, according to some embodiments disclosed herein, commences with event 503 in which the eUICC 110 of device 101 sends an eUICC challenge value and an euiccInfo1 data structure to the eSIM server 140. More information on the euiccInfo1 data structure and other data structures mentioned in this call flow can be found in SGP.22. At event 505, the eSIM server 140 responds with a server challenge and other data, indicating to the eUICC 110 to use a second CI ($CI_2$) for signing the server challenge, possibly without knowledge of the EID and its corresponding profile ICCID. At event 507, a logical entity of device 101, e.g., LPA 301, provides the eSIM server 140 with an AC, signed by eUICC 110, for this provisioning session, a signed server challenge using $CI_2$ and the eUICC 110 certificate signed by (or via a chain) $CI_2$. The AC may be entered into the device 101 for use by a logical entity of the device 101, e.g., LPA 301, by a user of the device 101 using, for example, manual typing or quick response (QR) code scanning. Alternatively, the AC may be delivered via a web portal during a activation of the device 101.

At event 509, the eSIM server 140 queries the negotiated database using the ICCID of the profile to be downloaded, the AC, and/or the EID of the eUICC 110. The eSIM server 140 then chooses a CI based on a result of the database query. The chosen CI is referred to as $CI_1$. In some embodiments, the eSIM server 140 evaluates a rule given in a policy to choose the CI. The eSIM server 140 then provides the indication of $CI_1$ to the eUICC 110 to be used for conveying the bound profile package (BPP) representing the profile to be downloaded to the device 101. This indication, in some embodiments, is a certificate, indicated in FIG. 5 as CERT.DP-PB($CI_1$). This indication may also indicate an elliptic curve for a one-time key pair generation by the eUICC 110, where the generated key pair is later used in profile encryption key generation, the elliptic curve being the same as the curve used in CERT.DP-PB($CI_1$). Encryption of the BPP by the eSIM server 140 can be based in part on an ephemeral private key (eSK) of the eSIM server 140, where an ephemeral public key (ePK) of the eSIM server, which corresponds to the ephemeral private key eSK of the eSIM server, is signed by the public key PK of CERT.DP-PB and ultimately (in terms of a certificate chain) signed by $CI_1$. The eSIM server 140, in some embodiments, mandates that the ephemeral key pair {eSK, ePK} be derived based on the same elliptic curve as the elliptic curve associated with CERT.DP-PB. More details on binding, elliptic curve cryptography (ECC) parameters, ephemeral keys, and delivery of a BPP during provisioning are provided in SGP.22. At 513, the eUICC 110 inserts the generated one-time public key to be used for provisioning in an euiccSigned2 data structure. The eUICC 110 signs the euiccSigned2 data structure using a private key for which the corresponding public key is in a certificate, CERT.EUICC, which is signed by $CI_2$. In some instances, the eUICC 110 switches to $CI_1$ to follow the chosen CI of the eSIM server 140; in such a case, the certificate in the response at event 513 will be CERT.EUICC signed by $CI_1$. Finally, at event 515, profile installation continues with the eSIM server 140 using keys associated with $CI_1$ and the eUICC 110 using CERT.DP-PB($CI_1$) to obtain the corresponding public key of the eSIM server 140 signed by $CI_1$.

Message Flow Using AC without Negotiated Database

Figure 6:
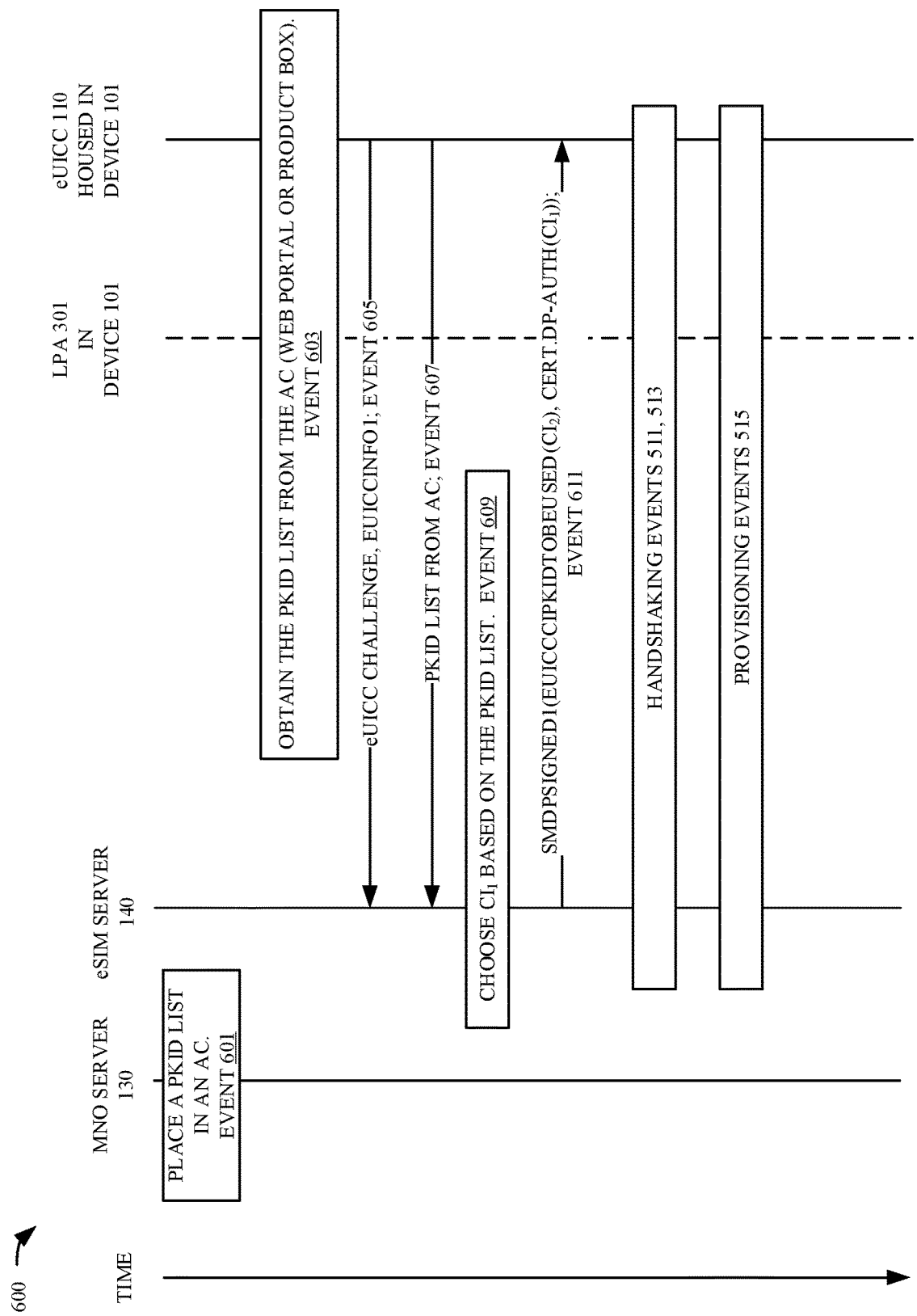
FIG. 6 illustrates an exemplary message flow diagram in which a PKID list is obtained by a device user during activation and is provided to an eSIM server, according to some embodiments.

FIG. 6 provides a message flow 600 corresponding to the logic 270 of FIG. 2C. The MNO, represented by the MNO server 130, places a PKID list in an AC at event 601. At 603, a logical entity of device 101, e.g., LPA 301, and the eUICC 110 obtain the PKID list from the AC via a web portal or a product box. If the AC is provided by a printed label on the product box, the logical entity of device 101, e.g., LPA 301, can obtain the AC by the user of the device 101 typing the AC into a user interface or by the user of the device QR scanning the label. At event 605, similar to the event 503 of FIG. 5, the eUICC 110 sends an eUICC challenge and euiccInfo1 to the eSIM server 140. At event 607, the LPA 301 or eUICC 110 parses the PKID list from the AC and sends the PKID list to the eSIM server 140. In some embodiments, event 607 and the other eSIM server exchanges with the logical entity of device 101, e.g., LPA 301, and the eUICC 110 are communicated via an ES9 interface. More information on roles and cooperation of an LPA and an eUICC can be found in SGP.22. At event 609, the eSIM server 140 chooses a first CI ($CI_1$) based on the PKID list received during the event 607. Whether the PKID list is mandatory to enforce or is only preferred during provisioning is a business decision between the MNO (represented by the MNO server 130) and the operator of the eSIM server 140. At event 611, the eSIM server 140 indicates to the eUICC 110 that the eSIM server 140 will use keys based on $CI_1$ for authentication and profile download. For example, the eSIM server 140 sends the certificate CERT.DP-AUTH($CI_1$). The eUICC 110 may be directed to use the same CI or a different CI for eUICC signing operations (and symmetric key generation). In FIG. 6, at event 611, the eUICC 110 is directed to use $CI_2$ by the argument euiccCIPKIDToBeUsed($CI_2$). Further handshaking and provisioning events then occur, similar to events 511, 513, and 515 of FIG. 5.

eUICC Details

Figure 7:
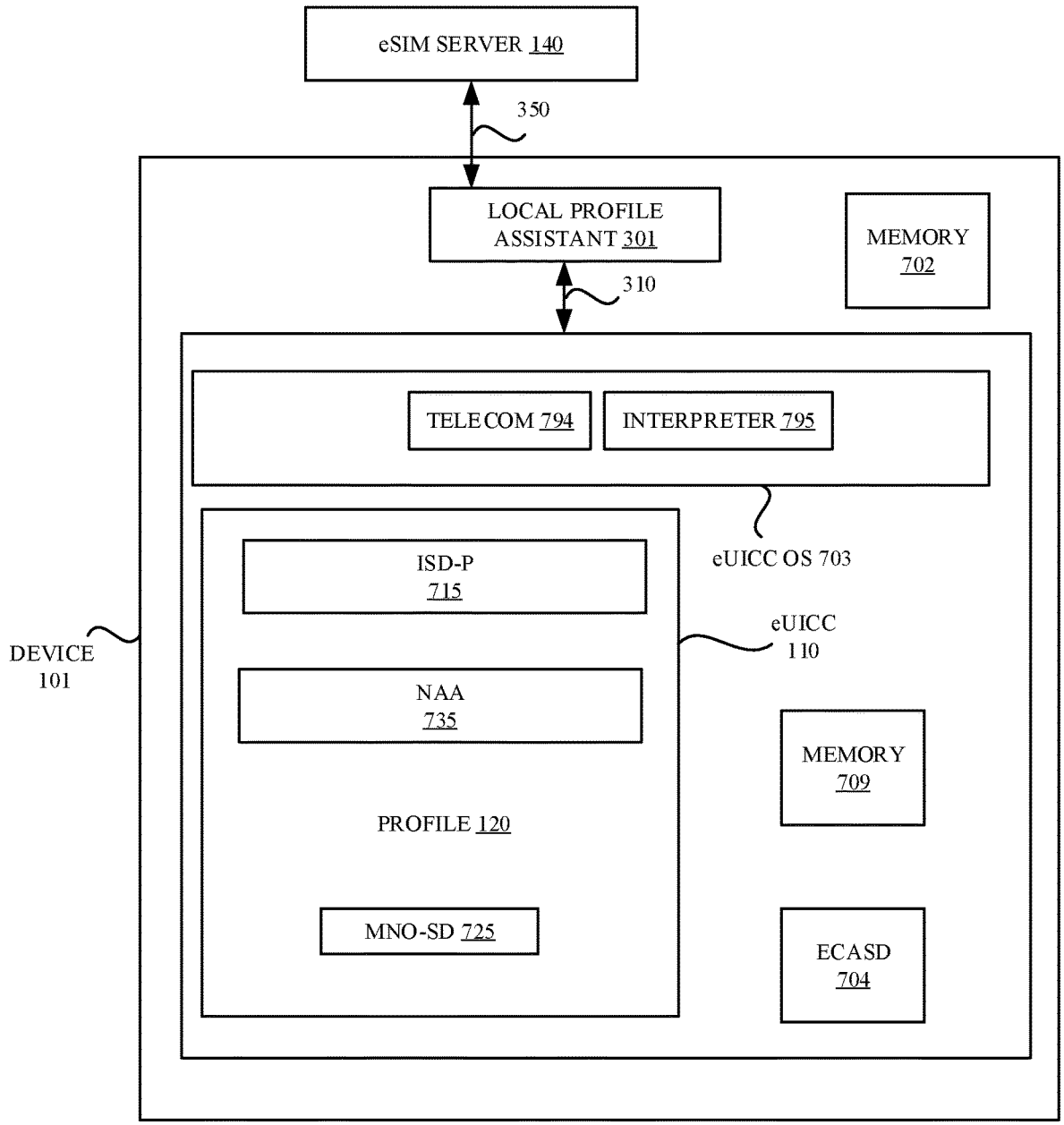
FIG. 7 illustrates an exemplary profile present on an eUICC in a device in communication with an eSIM server, according to some embodiments.

FIG. 7 illustrates further details of the eUICC 110 housed in the device 101 in a system 700. The device 101 includes a logical entity, e.g., the LPA 301 (which may be realized as a combination of hardware, firmware, and/or software) and the memory 702. The eUICC 110 includes an operating system 703. Within the operating system 703 is a telecom framework 794 which provides authentication algorithms to network access applications (NAAs), for example NAA 735. Interpreter 795 translates profile package data into an installed profile using a specific internal format of the eUICC 110. ISD-P 715 hosts the installed profile 120. An event processed by the device 101 with the eUICC 110 can include, for example, installing, enabling, or disabling of the profile 120.

The ISD-P is a secure container (security domain) for the hosting of the profile 120. The ISD-P is used for profile download and installation in collaboration with the interpreter 795 for the decoding of a received bound profile package. The eUICC 110 also includes a memory 709 and an embedded UICC controlling authority security domain (EC-ASD) 704. ECASD 704 provides secure storage of credentials required to support the security domains on eUICC 110. In some embodiments, certificates signed by $CI_1$ and/or $CI_2$ are stored in the memory 709 and/or in the ECASD 704. The MNO-SD 725 is the representative on the eUICC 110 of an operator providing services to an end user, for example, the MNO server 130. The MNO-SD 725 contains the operator's OTA keys and provides a secure OTA channel.

The eSIM server 140 communicates with a logical entity of device 101, e.g., with LPA 301, in some embodiments, via interface 350. The MNO server 130 also communicates directly with the eUICC or indirectly through the device 101 (these interfaces are not shown in FIG. 7).

Example Device Connections

Figure 8:
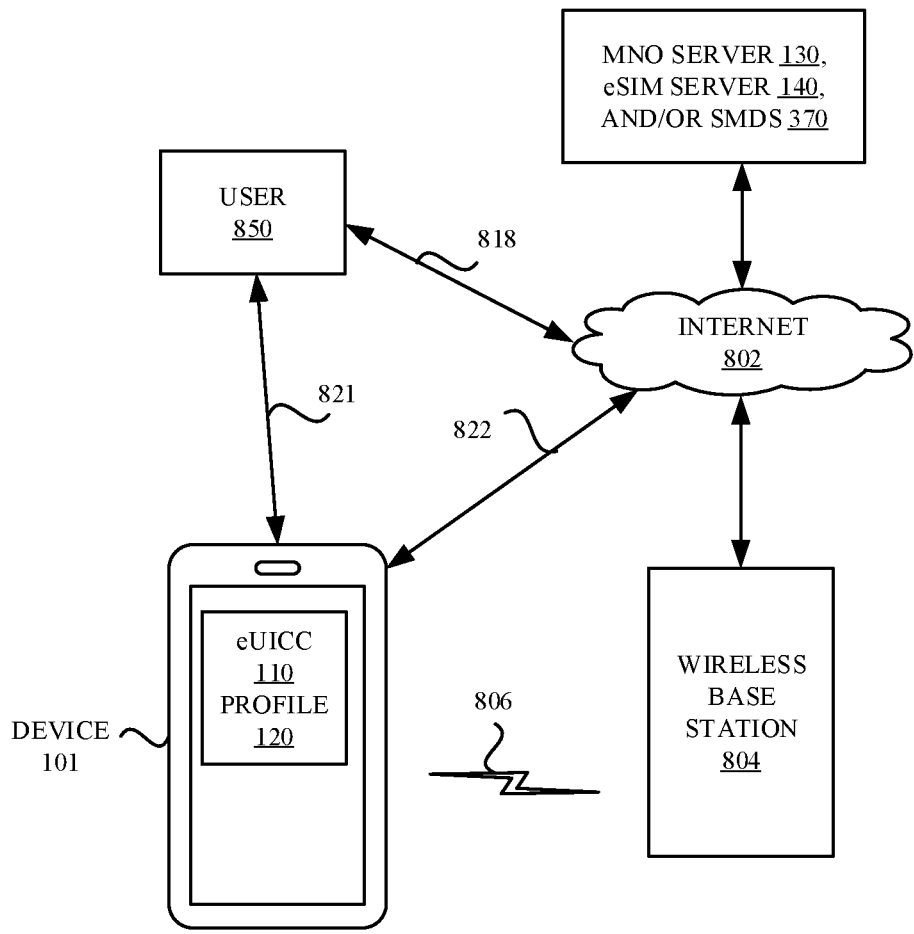
FIG. 8 illustrates exemplary connection methods of various entities described herein, according to some embodiments.

FIG. 8 illustrates example connection methods for managing profile provisioning with multiple CIs in a system 800. User 850 can manage device 101 using interface 821 which can support user interface inputs. The user 850 can also remotely manage device 101 via the Internet 802 using interface 818. The MNO server 130, the eSIM server 140 and/or the SM-DS 370 can communicate with the eUICC 110 via the Internet 802. The device 101 is shown connected to a wireless base station 804 by a wireless link 806 or to the Internet 802 via a wired connection 822. The wireless base station 804 can be an Institute of Electronic and Electrical Engineers 802.11 Wireless Fidelity (IEEE 802.11 Wi-Fi) access point (AP) or the wireless base station 804 can be, for example, a cellular mobile network base station. Examples of cellular mobile network base stations are a 2G or 3G base station or a Long Term Evolution (LTE) eNode B.

Representative Embodiments

In some embodiments, a method performed by an electronic subscriber identity module (eSIM) server includes: (i) receiving, from an embedded universal integrated circuit card (eUICC), a public key identifier (PKID) list and an eUICC challenge; (ii) selecting a certificate issuer (CI) to be used by the eSIM server as a trusted third party, where the selecting is based on the PKID list and produces a selected CI; (iii) signing the eUICC challenge using a private key during a profile installation flow to create a signature, where a public key corresponding to the private key is included in a certificate of the eSIM server signed by the selected CI; and (iv) sending, to the eUICC, the certificate signed by the selected CI, the signature, and an indication of a CI to be used by the eUICC for signing operations.

In some embodiments, the CI to be used by the eUICC for signing operations is the selected CI. In some embodiments, the CI to be used by the eUICC for signing operation is different from the selected CI. In some embodiments, the certificate is a certificate of the eSIM server used for authentication, and the public key included in the certificate is an elliptic curve cryptography digital signature algorithm (ECDSA) key. In some embodiments, the method further includes the eSIM server: (v) signing metadata using the private key, to create a second signature; and (vi) sending, to the eUICC, the metadata, the second signature, and a second certificate of the eSIM server signed by the selected CI. In some embodiments, the second certificate is a certificate of the eSIM server used for profile package binding. In some embodiments, the method further includes the eSIM server receiving from the eUICC an eUICC certificate that includes an eUICC public key and is signed using the CI indicated by the eSIM server to be used by the eUICC in signing operations. In some embodiments, the method further includes the eSIM server providing to the eUICC a bound profile package (BPP) for installation of a profile using one or more keys associated with the selected CI.

In some embodiments, a method performed by a subscription manager discovery server (SM-DS) includes: (i) receiving a registration message from an electronic subscriber identity module (eSIM) server, where the registration message includes (a) a server-supported list and (b) an identifier of a first certificate issuer (CI) supported by the eSIM server; (ii) determining a list of identifiers of CIs supported by an embedded universal integrated circuit card (eUICC) to produce an eUICC-supported list, where the eUICC is associated with an eUICC-ID (EID); (iii) determining a compatibility list associated with the EID based on CI identifiers found both: (a) on the server-supported list and (b) on the eUICC-supported list; (iv) sending an error message to the eSIM server, when the compatibility list is empty; and (v) responsive to receipt of an authenticate-client message from a device that houses the eUICC, sending to the device the compatibility list and an address of the eSIM server, when the compatibility list is not empty.

In some embodiments, the registration message is a registerevent message. In some embodiments, the identifier of the first CI is an object identifier (OID). In some embodiments, the method performed by the SM-DS further includes: (vi) storing the server supported list in an event record associated with an event identifier; and (vii) storing the compatibility list in the event record associated with the event identifier. In some embodiments, the method performed by the SM-DS further includes sending to the device the event identifier with the compatibility list and the address of the eSIM server responsive to receipt of the authenticate-client message from the device.

In some embodiments, a method performed by an embedded universal integrated circuit card (eUICC) housed in a device includes: (i) receiving an activation code (AC) message that includes a public key identifier (PKID) list; and (ii) providing the PKID list to an electronic subscriber identity module (eSIM) server during a remote subscriber identity module provisioning (RSP) session. In some embodiments, the AC message is received via a web portal. In some embodiments, the method performed by the eUICC further includes: (iii) sending to the eSIM server a public key identifier (PKID) and an eUICC challenge; and (iv) receiving from the eSIM server: (a) a certificate signed by a first certificate issuer (CI) selected by the eSIM server based on the PKID list, and (b) an indication of a second CI to be used by the eUICC for signing operations. In some embodiments, the second CI to be used by the eUICC in signing operations is the first CI selected by the eSIM server based on the PKID list. In some embodiments, the second CI to be used by the eUICC for signing operation is different from the first CI selected by the eSIM server based on the PKID list. In some embodiments, the certificate is a certificate of the eSIM server used for authentication. In some embodiments, the method performed by the eUICC further includes: (v) sending to the eSIM server an eUICC certificate that includes an eUICC public key and is signed using the second CI; (vi) receiving from the eSIM server a bound profile package (BPP) for installation of a profile using one or more keys associated with the first CI; and (vii) installing the profile on the eUICC.

In some embodiments, a method performed by an eSIM server includes: (i) receiving an activation code (AC) from an eUICC housed in a device; (ii) selecting a certificate issuer (CI) to be used by the eSIM server as a trusted third party, where the selecting is based on the AC and produces a selected CI; (iii) signing metadata using a private key during a profile installation flow, to create a signature, where a public key corresponding to the private key is included in a certificate signed by the selected CI; and (iv) sending, to the eUICC, the metadata, the signature, and a certificate of the eSIM server signed by the selected CI.

In some embodiments, a method performed by an eSIM server includes: (i) receiving, from an eUICC, a public key identifier (PKID) list and an eUICC challenge; (ii) selecting a certificate issuer (CI) to be used by the eSIM server as a trusted third party, where the selecting is based on the PKID list and produces a selected CI; (iii) signing the eUICC challenge using a private key during a profile installation flow to create a signature, where a public key corresponding to the private key is included in a certificate of the eSIM server signed by the selected CI; and (iv) sending, to the eUICC, the certificate signed by the selected CI, the signature, and an indication of CI to be used by the eUICC in signing operations. In some embodiments, the certificate is a CERT.DP-auth certificate. In some embodiments, the certificate is a certificate of the eSIM server used for authentication. In some embodiments, the public key included in the certificate is an elliptic curve cryptography digital signature algorithm (ECDSA) key. In some embodiments, the method performed by the eSIM server further includes: (v) signing metadata using the private key, to create a second signature; and (vi) sending, to the eUICC, the metadata, the signature, and a second certificate of the eSIM server signed by the selected CI. In some embodiments, the second certificate is a CERT.DP-pb certificate. In some embodiments, the second certificate is a certificate of the eSIM server used for profile package binding.

In some embodiments, a method performed by an eSIM server includes sending a registration message to a subscription manager discovery server (SM-DS), where the registration message includes a server-supported list, where the server-supported list includes an identifier of a first certificate issuer (CI) supported by the eSIM server, and where the registration message is associated with an embedded universal integrated circuit card (eUICC) associated with an eUICC-ID (EID) for which a profile for download has been reserved. In some embodiments, the method performed by the eSIM server further includes receiving an error message from the SM-DS, where the error message indicates that the eUICC does not support any certificate issuer (CI) supported by the eSIM server. In some embodiments, the method performed by the eSIM server further includes receiving a profile provisioning message from the eUICC; sending to the eUICC an authentication message; and providing a bound profile package (BPP) representing an encoding of the profile to the eUICC.

In some embodiments, a method performed by a subscription manager discovery server (SM-DS) includes: (i) receiving a registration message from an electronic subscriber identity module (eSIM) server, where the registration message includes a server-supported list, and where the server-supported list includes an identifier of a first certificate issuer (CI) supported by the eSIM server; (ii) storing the server-supported list in an event record associated with an event identifier; (iii) determining a list of identifiers of CIs supported by an embedded universal integrated circuit card (eUICC) to produce an eUICC-supported list, where the eUICC is associated with an eUICC-ID (EID); (iv) determining a compatibility list associated with the EID based on those CI identifiers found both: (a) on the server-supported list and (b) on the eUICC-supported list; (v) sending an error message to the eSIM server, when the compatibility list is empty; and (vi) when the compatibility list is not empty: (a) storing the compatibility list in the event record associated with the event identifier, (b) receiving an authentication message from a device, where the device houses the eUICC, (c) receiving an authenticate-client message from the device, and (d) in response to the authenticate-client message, sending to the device: the compatibility list, the event identifier, and an address of the eSIM server. In some embodiments, the registration message is a registerevent message. In some embodiments, the identifier of the first CI is an object identifier (OD). In some embodiments, the OID is a well-known OID.

In some embodiments, a method performed by an eSIM server includes: (i) receiving a profile provisioning message including: (a) a challenge from an embedded universal integrated circuit card (eUICC), and (b) an eUICC identifier, where the eUICC is housed in a device; (ii) signing over the challenge to produce a first signature, where the signing over the challenge includes using a first private key corresponding to a first public key, where a first certificate includes the first public key and the first certificate includes a certificate issuer (CI) signature of a first CI; (iii) sending the first signature to the eUICC; (iv) receiving a second profile provisioning message from the eUICC including an activation code (AC); (v) determining, based on the AC and the eUICC identifier, a second CI trusted by the eSIM server and trusted by a mobile network operator (MNO); (vi) determining, based on the AC and the eUICC identifier, a third CI trusted by the eSIM server and trusted by the MNO; (vii) identifying the second CI or the third CI as a selected CI based upon an eSIM server policy; (viii) forming a payload including profile metadata of a profile, where the profile is to be provisioned to the eUICC; (ix) signing the payload to produce a second signature, where the signing the payload includes using a second private key corresponding to a second public key, where a second certificate includes the second public key and the second certificate includes a signature of the selected CI; (x) sending to the eUICC: (a) the payload, (b) the second signature, and (c) the second certificate; (xi) receiving a third profile message including: (a) a one-time public key (otPK), and (b) a third signature; (xii) verifying the third signature using a third public key, where the third public key is included in a third certificate, and the third certificate includes a signature of a fourth CI; and (xiii) providing a bound profile package (BPP) representing an encoding of the profile to the eUICC via the device. In some embodiments, the fourth CI is the same as the selected CI.

In some embodiments, a method performed by a mobile network operator (MNO) server includes: (i) configuring an activation code (AC) message, where the AC message includes a public key identifier (PKID) list; and (ii) providing the AC message to an embedded universal integrated circuit card (eUICC). In some embodiments, the method performed by the MNO server further includes sending, over a web portal, the AC message to a device when the device is being activated by a user of the device.

In some embodiments, a method performed by an eUICC includes: (i) receiving an activation code (AC) message, where the AC message includes a public key identifier (PKID) list; and (ii) providing the PKID list to an electronic subscriber identity module (eSIM) server during a remote subscriber identity module provisioning (RSP) session. In some embodiments, the AC message is received over a web portal.

In some embodiments, a method performed by an eSIM server includes: (i) receiving a first message from an embedded universal integrated circuit card (eUICC), the first message including: (a) a challenge and (b) an eUICC identifier; (ii) receiving a second message from the eUICC, where the second message includes a public key identifier (PKID) list; (iii) identifying a selected certificate issuer (CI) from the PKID list based upon an eSIM server policy; (iv) signing the challenge to produce a first signature, where the signing the challenge includes using a first private key corresponding to a first public key, where a first certificate includes the first public key and the first certificate includes a signature of the selected CI; (v) sending the first signature to the eUICC; (vi) receiving a third message from the eUICC including an activation code (AC); (vii) forming a payload including profile metadata of a profile, where the profile is to be provisioned to the eUICC; (viii) signing over the payload to produce a second signature, where the signing over the payload includes using the first private key; (ix) sending to the eUICC: (a) the payload, and (b) the second signature; and (x) providing a bound profile package (BPP) representing an encoding of the profile to the eUICC.

Wireless Device Terminology and Features

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) radio access technologies. In these scenarios, a multi-mode wireless device or universal equipment (UE) can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 9:
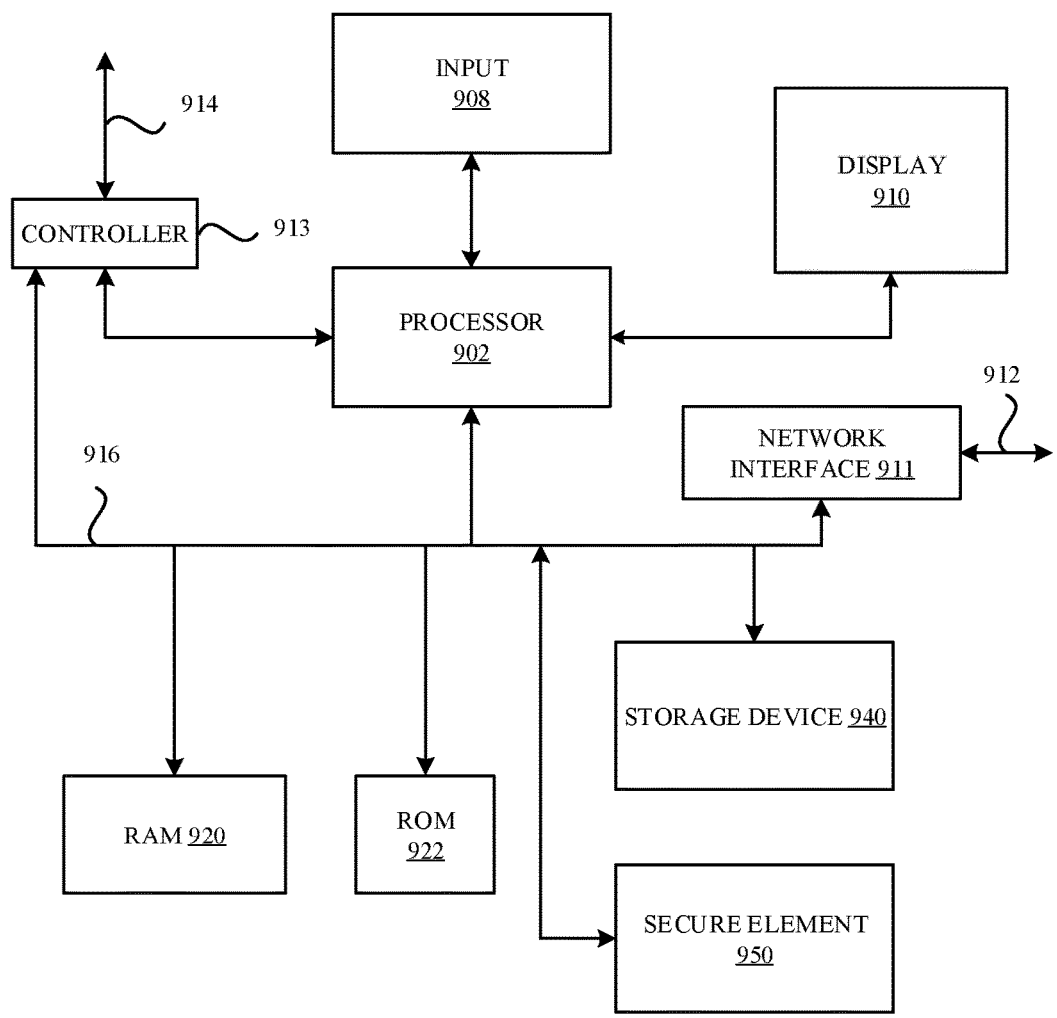
FIG. 9 illustrates an exemplary apparatus for implementation of embodiments disclosed herein, according to some embodiments.

FIG. 9 illustrates in block diagram format an exemplary computing device 900 that can be used to implement the various components and techniques described herein, according to some embodiments. In particular, the detailed view of the exemplary computing device 900 illustrates various components that can be included in the device 101, the eUICC 110, the eSIM server 140, SM-DS 370, and/or the MNO server 130 illustrated in any of FIGS. 1A to 8. As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 (screen display) that can be controlled by the processor 902 to display information to the user (for example, information relating to incoming, outgoing, or active communication session). A data bus 916 can facilitate data transfer between at least a storage device 940, the processor 902, and a controller 913. The controller 913 can be used to interface with and control different equipment through an equipment control bus 914. The computing device 900 can also include a network/bus interface 911 that couples to a data link 912. In the case of a wireless connection, the network/bus interface 911 can include wireless circuitry, such as a wireless transceiver and/or baseband processor. The computing device 900 can also include a secure element 950. The secure element 950 can include a universal integrated circuit card (UICC) UICC or an embedded UICC (eUICC). In some embodiments, the computing device 900 includes a baseband processor, one or more radio frequency (RF) transceivers and one or more antennas (not shown).

The computing device 900 also includes a storage device 940, which can include a single storage or a plurality of storages (e.g., hard drives), and includes a storage management module that manages one or more partitions within the storage device 940. In some embodiments, storage device 940 can include flash memory, semiconductor (solid state) memory or the like. The computing device 900 can also include a Random Access Memory (RAM) 920 and a Read-Only Memory (ROM) 922. The ROM 922 can store programs, utilities or processes to be executed in a non-volatile manner. The RAM 920 can provide volatile data storage, and stores instructions related to the operation of the computing device 900.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. In some instances, the computer readable medium is a non-transitory computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:
1. A method comprising:
by an electronic subscriber identity module (eSIM) server during a remote subscriber identity module provisioning (RSP) session:
receiving, from an embedded universal integrated circuit card (eUICC), an eUICC challenge and an eUICC information data structure;
receiving, from the eUICC, a public key identifier (PKID) list obtained by the eUICC from an activation code (AC) message;
selecting a certificate issuer (CI) to be used by the eSIM server as a trusted third party, wherein the selecting is based on the PKID list and produces a selected CI;
signing the eUICC challenge using a private key during a profile installation flow to create a signature, wherein a public key corresponding to the private key is included in a certificate of the eSIM server signed by the selected CI; and
sending, to the eUICC, the certificate signed by the selected CI, the signature, and an indication of a second CI to be used by the eUICC for signing operations.

2. The method of claim 1, wherein the second CI to be used by the eUICC for signing operations is the selected CI.

3. The method of claim 1, wherein the second CI to be used by the eUICC for signing operation is different from the selected CI.

4. The method of claim 1, wherein:
the certificate is a certificate of the eSIM server used for authentication; and
the public key included in the certificate is an elliptic curve cryptography digital signature algorithm (ECDSA) key.

5. The method of claim 1, further comprising:
by the eSIM server:
signing metadata using the private key, to create a second signature; and
sending, to the eUICC, the metadata, the second signature, and a second certificate of the eSIM server signed by the selected CI.

6. The method of claim 5, wherein:
the second certificate is a certificate of the eSIM server used for profile package binding.

7. The method of claim 1, further comprising:
by the eSIM server:
receiving from the eUICC an eUICC certificate that includes an eUICC public key and is signed using the second CI indicated by the eSIM server to be used by the eUICC in signing operations.

8. The method of claim 7, further comprising:
by the eSIM server:
providing to the eUICC a bound profile package (BPP) for installation of a profile using one or more keys associated with the selected CI.

9. The method of claim 1, wherein information in the eUICC information data structure is not reduced or sorted based on the PKID list obtained from the AC message.

10. A method comprising:
at an embedded universal integrated circuit card (eUICC) housed in a device:
sending to an electronic subscriber identity module (eSIM) server an eUICC challenge and an eUICC information data structure;
receiving an activation code (AC) message that includes a public key identifier (PKID) list;
providing the PKID list to the eSIM server during a remote subscriber identity module provisioning (RSP) session; and receiving from the eSIM server:
    a certificate signed by a first certificate issuer (CI) selected by the eSIM server based on the PKID list, and
    an indication of a second CI to be used by the eUICC for signing operations.

11. The method of claim 10, wherein the AC message is received via a web portal.

12. The method of claim 10, wherein the second CI to be used by the eUICC in signing operations is the first CI selected by the eSIM server based on the PKID list.

13. The method of claim 10, wherein the second CI to be used by the eUICC for signing operation is different from the first CI selected by the eSIM server based on the PKID list.

14. The method of claim 10, wherein:
    the certificate is a certificate of the eSIM server used for authentication.

15. The method of claim 10, further comprising:
    by the eUICC:
        sending to the eSIM server an eUICC certificate that includes an eUICC public key and is signed using the second CI;
        receiving from the eSIM server a bound profile package (BPP) for installation of a profile using one or more keys associated with the first CI; and
        installing the profile on the eUICC.

16. An embedded universal integrated circuit card (eUICC) configurable for operation in a device, the eUICC comprising:
    a processor, and
    a memory communicatively coupled to the processor and storing instructions that, when executed by the processor, cause the eUICC to perform actions including:
        sending to an electronic subscriber identity module (eSIM) server an eUICC challenge and an eUICC information data structure;
        receiving, via a web portal, an activation code (AC) message that includes a public key identifier (PKID) list;
        providing the PKID list to the eSIM server during a remote subscriber identity module provisioning (RSP) session; and
        receiving from the eSIM server:
            a certificate signed by a first certificate issuer (CI) selected by the eSIM server based on the PKID list, and
            an indication of a second CI to be used by the eUICC for signing operations.

17. The eUICC of claim 16, wherein the second CI to be used by the eUICC in signing operations is the first CI selected by the eSIM server based on the PKID list.

18. The eUICC of claim 16, wherein the second CI to be used by the eUICC for signing operation is different from the first CI selected by the eSIM server based on the PKID list.

19. The eUICC of claim 16, wherein:
    the certificate is a certificate of the eSIM server used for authentication.

20. The eUICC of claim 16, wherein the actions performed by the eUICC further include:
    sending to the eSIM server an eUICC certificate that includes an eUICC public key and is signed using the second CI;
    receiving from the eSIM server a bound profile package (BPP) for installation of a profile using one or more keys associated with the first CI; and
    installing the profile on the eUICC.

* * * * *

UNITED STATES PATENT AND TRADEMARK OFFICE
CERTIFICATE OF CORRECTION

PATENT NO. : 10,985,926 B2
APPLICATION NO. : 16/117642
DATED : April 20, 2021
INVENTOR(S) : Yang et al.

Page 1 of 1

It is certified that error appears in the above-identified patent and that said Letters Patent is hereby corrected as shown below:

In the Specification

At Column 14, Line 48: "is an object identifier (OD). In some embodiments, the OID" should read
-- is an object identifier (OID). In some embodiments, the OID --.

Signed and Sealed this
Thirteenth Day of September, 2022

Katherine Kelly Vidal
*Director of the United States Patent and Trademark Office*